Dec. 7, 1965  H. T. JENKINS  3,221,485
MULTIPURPOSE HAND TOOL ARRANGEMENT
Filed July 24, 1962  2 Sheets-Sheet 1
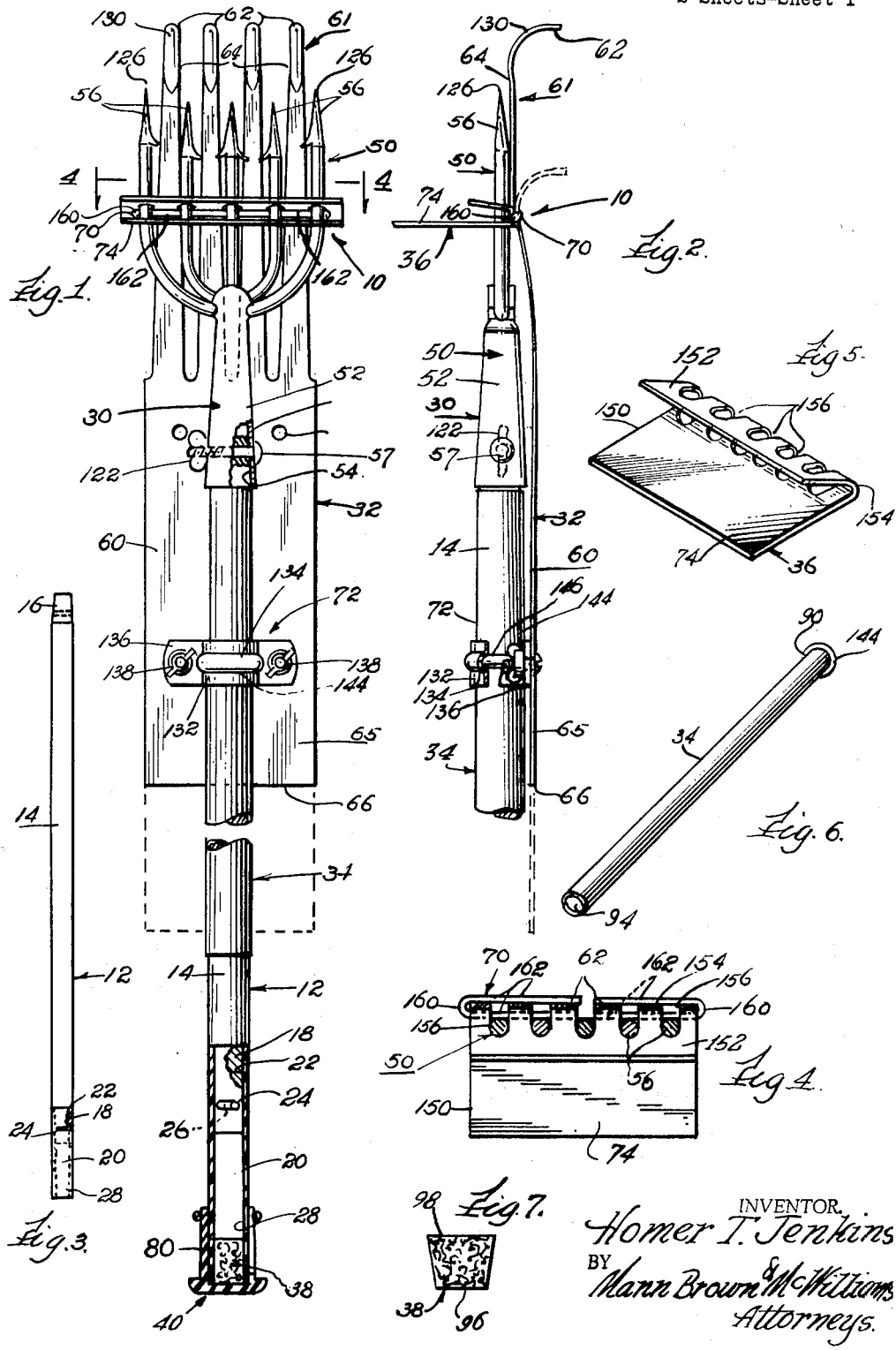
INVENTOR.
Homer T. Jenkins
BY Mann Brown & McWilliams
Attorneys.

Dec. 7, 1965   H. T. JENKINS   3,221,485
MULTIPURPOSE HAND TOOL ARRANGEMENT
Filed July 24, 1962   2 Sheets-Sheet 2
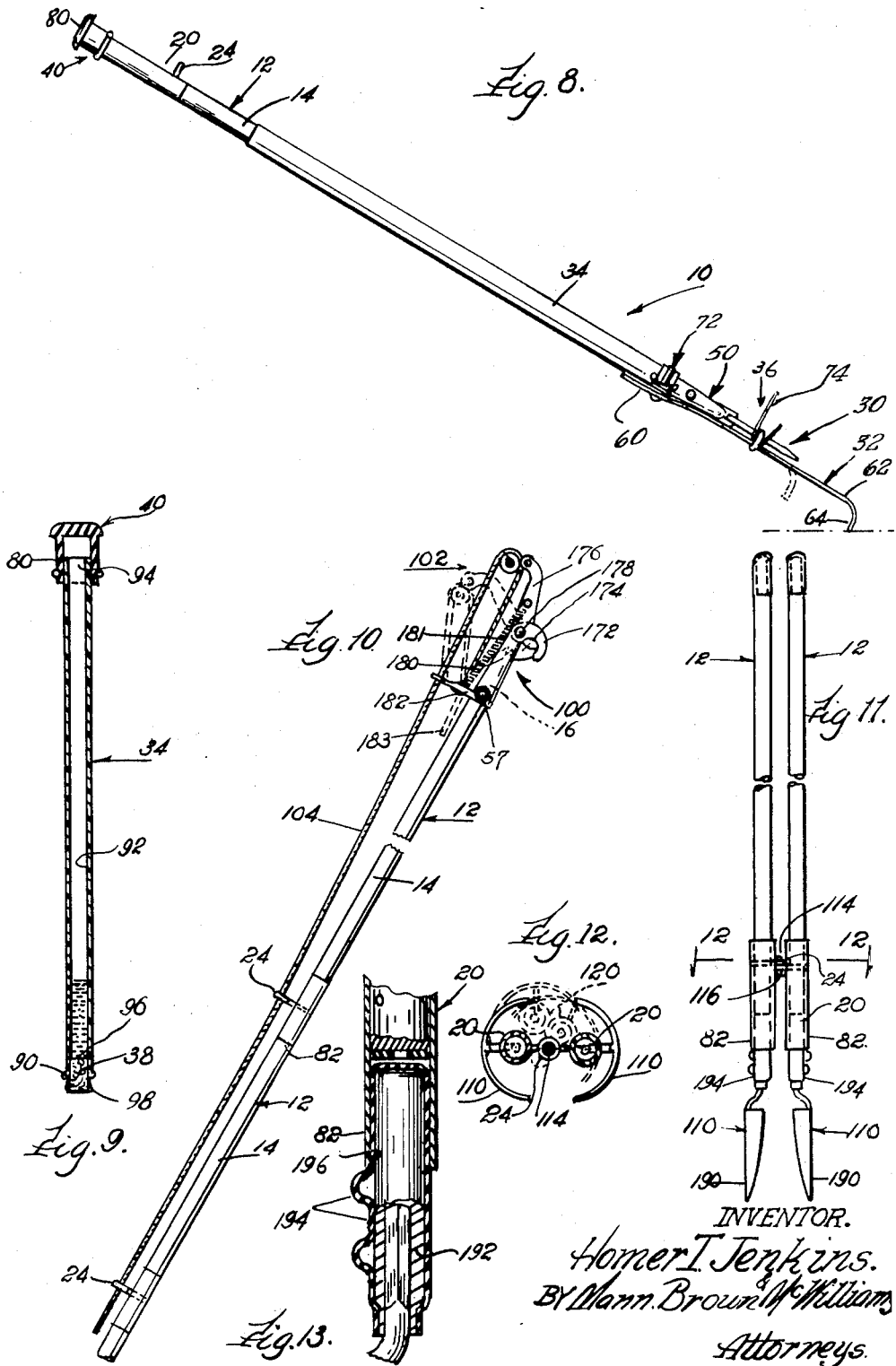
INVENTOR.
Homer T. Jenkins.
BY Mann, Brown & McWilliams
Attorneys.

United States Patent Office 3,221,485
Patented Dec. 7, 1965

3,221,485
MULTIPURPOSE HAND TOOL ARRANGEMENT
Homer T. Jenkins, 161 E. Grand Ave., Chicago, Ill.
Filed July 24, 1962, Ser. No. 211,966
3 Claims. (Cl. 56—400.06)

My invention relates to a multipurpose hand tool arrangement, and more particularly, to a hand tool arrangement capable of a number of different uses in which all adjustments necessary can be effected without the use of hand tools.

Most forms of hand tools for gardening purposes and other uses around one's home have only one principal use, which means that when one is working on a job that requires several different types of operations, he must have with him all of the tools required to do the job, or he must repeatedly return to the place of storage for the needed tool.

Furthermore, hand tools of this type ordinarily are not available in sets which provide for a common handle member and an assortment of working implements.

Consequently, the home owner who chooses to garden and do other "do-it-yourself" jobs around the home, is forced to buy and pay for a separate complete tool for each working operation to be effected.

A principal object of this invention is to provide a tool arrangement capable of being used to perform a number of different jobs by merely changing the position of the tool or making a minor operating adjustment.

Another important object of the invention is to provide a multipurpose tool in which the operating features thereof are employed to permit performance of closely related jobs with the same tool.

A further important object of the invention is to provide an all purpose tool handle structure that may be used as the basic component of a wide variety of implement arrangements.

Other objects of the invention are to provide a multipurpose hand rake combination unit providing for adjustment both in the effective length of the rake tongs and their tension, to provide a multipurpose gardening device which may be alternately used either as a rake, a hoe, or a scraper, to provide a novel form of extensible and retractable rake head for hand rake implements, and to provide hand tool arrangements that are inexpensive of manufacture, convenient in use and adjustment, and freely interchangeable with each other.

Other objects, uses and advantages will become obvious or be apparent from a consideration of the following detailed description and the application drawings.

In the drawings:

FIGURE 1 is a plan view illustrating one embodiment of my hand tool arrangement, which in the form illustrated is adjusted for use as a rake, parts being broken away to facilitate illustration;

FIGURE 2 is a side elevational view of the implement shown in FIGURE 1;

FIGURE 3 is a plan view of the all purpose tool handle structure that forms the basic component of this invention;

FIGURE 4 is a cross-sectional view substantially along line 4—4 of FIGURE 1;

FIGURE 5 is a diagrammatic perspective view of the hoe forming implement that is associated with the tool arrangement of FIGURES 1 and 2;

FIGURE 6 is a diagrammatic perspective view on a reduced scale illustrating an actuating sleeve member that is associated with the tool arrangement of FIGURES 1 and 2;

FIGURE 7 is a plan view of a sponge element arranged for association with the tool arrangement of FIGURES 1 and 2 for the purpose of effecting another important use of my invention;

FIGURE 8 is a full length side elevational view of the tool arrangement shown in FIGURE 1, on a somewhat reduced scale;

FIGURE 9 illustrates the utilization of the actuating sleeve of FIGURE 6 and the sponge element of FIGURE 7 to form a weed killing implement;

FIGURE 10 is a side elevational view of a tree trimmer implement arranged in which the basic handle structure of this invention is employable;

FIGURE 11 is an elevational view illustrating another tool arrangement in which the basic handle structure of this invention is employed;

FIGURE 12 is a cross-sectional view substantially along line 12—12 of FIGURE 11; and FIGURE 13 is a fragmental view on an enlarged scale of the lower end of one of the handle components shown in FIGURE 11, illustrating the manner in which the illustrated trowel element is applied thereto, parts being broken away to facilitate illustration.

However, the specific arrangements shown in the drawings are provided primarily for the purpose of complying with the requirements of 35 U.S.C. 112, and it will be immediately apparent that the invention is capable of many other specific forms and arrangements which will be obvious to those skilled in the art.

*General description*

Reference numeral 10 of FIGURES 1, 2 and 8 generally indicates a preferred form of tool arrangement in accordance with my invention which is made up of several distinct components built up on a multipurpose tool handle structure generally indicated at 12 in FIGURE 3, which thus forms the basic component of this invention.

The handle structure 12 in the illustrated embodiment of the invention takes the form of an elongate wooden handle 14 formed with a pair of reduced end portions 16 and 18. The handle 14 may have the usual round shape that is usually associated with hand gardening tools. Applied to the end 18 is a mounting sleeve 20 that is formed from a suitable plastic or metallic substance, which is formed to define a bore 22 in which the handle end 18 is disposed. Preferably, the bore 22 and the handle end 18 should be complementarily proportioned so that there will be a friction fit between the two. Handle end 18 may be cylindrical in shape, but handle end 16 should be tapered somewhat as indicated.

As best shown in FIGURES 1, 3 and 8, a screw eye 24 is turned into the handle end portion 18 through the sidewall of the sleeve 20, with the screw eye defining the usual opening 26, which in the present instance is aligned with an axis extending longitudinally of the handle 14.

It will be observed from FIGURES 1 and 3 that the handle portion 18 does not extend the full length of sleeve bore 22, but leaves the outer end 28 thereof free to receive other structures forming components of this invention.

In accordance with this invention, the handle structure 12 is employed together with a number of different forms of implement components to provide my multipurpose hand tool arrangement.

In addition to the basic handle structure 12, my tool arrangement also contemplates the use of a forked or pronged tool component 30 (see FIGURES 1, 2 and 8), a rake component 32 which includes an actuating sleeve component 34, a hoe component 36, a sponge component 38 (see FIGURES 1 and 7), and a cap component 40 (see FIGURES 1 and 8).

The forked or pronged tool component 30 generally comprises in the form illustrated a multi-pronged spear head 50 including a handle portion 52 defining a bore 54 that receives the end portion 16 of handle structure 12. In the form illustrated, the spear head 50 defines a plurality of rigid prongs 56. Bore 54 is tapered to conform to the shape of handle end 16, and head 50 is secured in place by bolt 57.

The rake component 32 is defined by a slidably mounted sheet member 60 formed to define at one end 61 thereof a plurality of resiliently flexible prong elements 62 having their ends 64 angled approximately as shown to define a rake head end.

The other end 65 of the sheet 60 is formed with a straight or rectilinear scraping edge 66, it being contemplated that the member 60 be reversibly mounted so that the scraper end 65 may be disposed at the upper end of the tool arrangement as shown in FIGURES 1 and 2 in place of the rake end 61.

In accordance with this invention, the forked or pronged tool prongs 56 carry a looped guide structure generally indicated at 70 through which the rake prong elements 62 extend for the purpose of guiding the movement of the rake prongs between the extended and retracted positions shown in FIGURE 2. The looped guide structure 70 also provides automatic adjustment of the flexibility or tensioning of the rake prong elements 62.

The sheet member 60 is actuated by moving actuating sleeve 34 longitudinally of the handle 14. The actuating sleeve 34 is received over the handle 14, in the illustrated embodiment, and is connected thereto by connector device 72.

The hoe component 36 defines a hoe blade 74 which in accordance with this invention is held in place and forms a part of the looped guide structure 70. The blade 74 and the rake sheet member 60 are applied to opposite sides of the forked or pronged tool head 30, as clearly shown in FIGURES 2 and 8.

The sponge element 38 comprises a frusto-conical body formed from sponge rubber or the like which is proportioned to be frictionally received within the end 28 of bore 22 of mounting sleeve 20.

The cap component 40 comprises a cupped shaped cap member 80 formed from a suitable resiliently flexible material such as natural or synthetic rubber, and preferably is proportioned to be frictionally received over the end 28 of mounting sleeve 20.

The purpose of the sponge element 38 will become clear as the disclosure proceeds.

It will be immediately apparent from what has been so far disclosed that my tool arrangement has a number of important uses.

When arranged as indicated in FIGURES 1, 2 and 8, the tool may be used alternately as a forked or pronged implement, a rake, or a hoe.

As already mentioned, the rake component 32 is movable longitudinally of handle 14, and this is done by the operator grasping the actuating sleeve 34 and moving it in the direction desired.

If the tool is to be used for light cultivating purposes or for spearing litter, the actuating sleeve 34 is moved in the direction of mounting sleeve 20 to retract the rake prong element 62 to the dashed line position of FIGURE 2.

If the tool is to be used as a rake, it is appropriately positioned in the manner indicated in FIGURE 8 and the actuating sleeve 34 moved away from the mounting sleeve 20 to extend the rake prong elements 62 to the desired position. In this connection, it is pointed out that the flexibility of the rake prong elements 62 may be adjusted by positioning such elements at the desired position of extension from the looped guide structure 70.

The adjustability of the flexibility of the rake prong element 62 is an important feature of the invention since rake prong flexibility requirements are substantially different for many of the types of raking jobs one must perform. For instance, when one is raking leaves, the prong elements should be quite flexible, but if one is raking dirt, sand or trash, it is desirable that the element 62 be comparatively rigid. These as well as all intermediate degrees of flexibility in between the extreme positions shown in FIGURE 2 may be provided by operating the rake component in the manner just described.

Where it is desired to use the tool as a hoe, it is only necessary to turn the tool over 180 degrees from the position of FIGURE 8 to bring the hoe blade 74 into proper operating position for use as a hoe.

Several other important uses of my tool arrangement are brought out in FIGURES 9–13.

I prefer that the forked tool head 30 be removably mounted on handle 14, as already indicated, so that it and the rake component 32 may be readily removed from handle structure 12 to utilize the handle structure 12 for other purposes.

One important utilization of several of the tool components above described is illustrated in FIGURE 9, wherein the actuating sleeve 34, the sponge element 38, and the cap 40 are associated together to form a weed killer implement. To do this, the actuating sleeve is disconnected from the sheet member 60 and the sponge element 38 applied to its end 90 somewhat as indicated in FIGURE 9, after which the end 90 of sleeve 34 is supplied with a suitable quantity of liquid weed killer, whereupon the cap 40 may be applied to the other end 94 of sleeve 34.

One may then go about one's lawn or yard and press the sponge element 38 against weeds one desires to eliminate to apply weed killer thereto.

Of course, the smaller end 96 of the sponge element 38 should be inserted within the end 90 of sleeve 34 so that the larger end 98 serves as the applicator surface.

When the weed killing function has been completed, the components indicated may be disassembled and reapplied to the handle structure 12 for further use of the tool in the form shown in FIGURES 1, 2 and 8.

Alternately, several of the handle structures 12 may be employed in association with a conventional tree trimmer head structure 100 to provide the tree trimmer implement 102 diagrammatically illustrated in FIGURE 10.

For this purpose, the handle structure 12 is employed in the form indicated in FIGURE 3 and the tree trimmer head 100 is applied to its end 16 in any suitable manner, but preferably by using bolt 57. A like handle structure 12 has its end 16 received in the end 82 of the first handle structure 12 mounting sleeve 20, and then the actuating cord or rope 104 that is customarily associated with tree trimmers is threaded through the screw eyes 24 of the two handle structures 12.

When the handle structures and the tree trimmer head are assembled as indicated in FIGURE 10, the resulting implement may be employed in the usual tree trimmer operating manner, and after this purpose has been served, the handle structures 12 may be disconnected for other utilization purposes in accordance with this invention.

An additional utilization purpose of the basic handle structure 12 is diagrammatically illustrated in FIGURES 11–13, wherein two of the handle structures 12 in the form shown in FIGURE 3 have applied to the ends 28 of the mounting sleeves 20 a hand trowel 110, the handle 112 of which is frictionally received within the associated mounting sleeve 20 in the manner suggested by FIGURE 13.

In addition, the screw eyes 24 of the two handle structures 12 are connected together by a suitable bolt 114 which may be held in place by an appropriate nut 116.

This connects the handle structures 12 together to form a post hole digging or plant balling tool in which the handles 12 may be pivoted toward and away from each other about an axis extending normally of these handles and passing through the area of the screw eyes 24 to move the trowels 110 toward and away from each other.

This handling action of the handle structures 12 will provide the desired grappling action of the trowels 110.

However, due to the pivotal connection between the screw eyes 24, the handle structures 112 may be swung together about an axis extending longitudinally of the respective handle structures and through the center of bolt 114 to dispose the trowels in side-by-side relation to serve as a shovel arrangement.

It will therefore be seen that I have provided a highly versatile tool arrangement that has many important and related uses to facilitate yard and garden care.

*Specific description*

The essential features of the basic handle structure 12 have already been described, though it is pointed out that the end portion 16 of handle 14 is preferably tapered somewhat to conform to the usual internal shape of the socketed end portion 52 of fork or prong tool head 50 and tree trimmer at 100. In addition, the extension 16 and head 50 should be formed with transversely extending openings to receive bolt 57 for the purpose of securing the head 50 in place. Bolt 57, as indicated in FIGURE 1, is preferably associated with a thumb screw 122 for ease in assembling and disassembling these elements, and as indicated in FIGURES 1 and 2, the bolt 57 lies in a plane that is parallel to the plane of operation of the rake sheet member 60.

The forked or prong tool head 50 may be of any appropriate type, although that illustrated is commercially available in the form of a head for a fish spear. The main requirement is that the prongs 56 be rigid and have sharp pointed ends 126.

The sheet member 60 of the rake component 32 is preferably formed from a metallic or plastic material having a resilient flexibility equivalent to that of spring steel. In the form illustrated, the member 16 is stamped from spring steel sheeting, and the prongs 62 are rounded somewhat as indicated at 130 for reinforcing purposes.

The securing device 72 for detachably connecting the actuating sleeve 34 and the sheet member 60 comprises a winged U-shaped member 132 including U-shaped portion 134 that is received over the end 90 of the sleeve 34 and wing portions 136 which are formed with suitable perforations to receive bolts 138 that pass through similar perforations 140 formed in the sheet member 60, with the bolts or screws 140 being secured in place by appropriate thumb screws 142.

Preferably, sleeve 34 at its end 90 is formed with a circumambient ridge or ledge 144 and the U-portion 134 of element 132 is formed to define a complementing groove or recess 146 for the purpose of keying the element 132 to the actuating sleeve 134.

The hoe component 36 is best shown in FIGURES 4 and 5, and as indicated, it comprises a sheet member 150 having one edge or end portion 152 turned over the main body of the sheet to define a bent portion 154 that is slotted as indicated at 156 to receive the rigid prong elements 56 of the pronged head 50 (see FIGURE 4).

The looped guide structure 70 is formed by the bent portion 154 of the sheet 150 and a pair of U-shaped locking pins or elements 160 that in accordance with this invention are employed to fix the component 36 in place of the prongs 56 of head 50.

As indicated in FIGURE 4, the pins or elements 160 each include a pair of arms 162 that are preferably of substantially equal lengths, and in accordance with this invention, one of the arms 162 of each pin or element 160 is applied between the bent portion 154 of the sheet 150 and the rigid prongs 56 to bind these elements together. Obviously, the relation between the proportioning of the arms 162, the slots 156, and the thickness of the prongs 56 must be such that there will be a tight friction fit between these elements when the indicated arms 162 are inserted in the manner indicated in FIGURE 4.

This positioning of the U-shaped locking pins or elements 160 dispose an arm 162 of each outside of the bent portion 154 of the sheet 150 and thus disposing these latter arms 162 to serve as a guide for sheet member 60, and in particular, its prong elements 62 or its scraper end 65.

The sheet member 60 is formed with an extra pair of openings 140 which should be so disposed that when the sheet 60 is removed and reversed, the scraping edge 66 will have a positioning similar to the extended and retracted positions of the rake prongs shown in FIGURE 2.

The actuating sleeve 34 is preferably formed from a like plastic substance to facilitate manufacturing, but obviously, metals or other suitable substances may be employed to suit conditions. It preferably is proportioned in length to cover a major portion of the handle 14 (see FIGURE 8) so as to be readily grasped by the user, with appropriate allowance being made to permit the desired reciprocating movement indicated. It will thus be seen that the actuating sleeve 34 is readily grasped when using my tool arrangement, and in addition to providing the tool uses already indicated, it permits the user to adjust the tool length to suit his height, with regard to the rake and scraping features of the invention.

The tree trimming head 100 of FIGURE 10 is a commercial form of tree trimmer device employing a socketed head structure 170 that includes appropriate holes for receiving the bolt 120 of FIGURE 1 to secure same to a handle structure 12. Also associated with the head 100 is a hooked end 172 in connection with which cutting blade 174 cooperates with to provide the usual cutting action. Cutting blade 174 is applied to one end of a lever 176 that is pivoted to head 100 by pin 178 and is connected at one end thereof to rope or cord 104. A suitable conventional compression spring arrangement generally indicated at 180 (including spring 181 and guide rod 183) is interposed between the lever 176 and a flange 182 of head 170 to bias the cutting blade 174 to its full line inoperative position.

In the illustrated form, the rope 104 is connected to lever 176 by being trained over pulley 184 that is journalled on the lever 176, with the rope end actually being connected to the head flange 182.

The trowels 110 employed in the showing of FIGURES 11–13 are commercially available hand implements comprising trowel element 190 provided with a wooden handle 192 having a rubber hand grip cover 194 applied thereto. In accordance with this invention, the end 82 of the mounting sleeve 20 is proportioned to frictionally receive the end 196 of the hand grip 194. Of course, other trowel-like tools may be substituted for those indicated at 110, though it is contemplated that an appropriate friction fit should be employed between the handle of the trowel member and the mounting sleeve 20.

It will thus be seen that I have provided a most useful and efficient multipurpose gardening tool. The various components of this tool can be made from or formed by commercial structures readily available on the market. Furthermore, all adjustments necessary can be made without any tools whatsoever since thumb screws are readily handled by even the most mechanically inexperienced persons.

When the tool arrangement of FIGURES 1, 2 and 8 is adjusted to use the pronged head 30, the tool may be used for light cultivating purposes in one's garden or among one's bushes, or for picking up scattered leaves, paper, or other litter.

By making a simple adjustment with one's hand to appropriately position the actuating sleeve 34, the rake component can be extended to the desired position so that the tool may serve as a rake.

Alternately, the tool may be turned over to position the hoe component 36 for operating the tool as a hoe.

Where a scraper is desired, the sheet member 60 can be disconnected, reversed, and reapplied to position scraper edge 66 for use in scraping sidewalks, steps, walls and the like.

When it is desired to apply weed killer, the arrangement of FIGURE 9 can be composed of the several components illustrated.

As suggested by FIGURES 10–13, the basic handle structure 12 is readily incorporated in other combinations to provide highly useful working implements.

My tool arrangement not only has a multiplicity of uses, but also can be inexpensively manufactured and distributed. Its multitude of uses opens up unusually attractive merchandising approaches since the same tool can be sold in several different departments of the same store.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:
1. A hand tool comprising:
  a pronged head, including a plurality of prongs, secured to one end of the handle,
  an elongate blade member carried on the handle with one portion thereof in juxtaposition with the prongs of said head and having one side facing away from said head prongs,
  said blade member extending longitudinally of said handle and being mounted for movement longitudinally of said handle,
  an elongate sleeve member mounted on said handle for shifting movement longitudinally thereof,
  means for securing said sleeve member to said blade member for moving said blade member longitudinally of said handle member to shift said blade member portion with respect to said head prongs,
  a hoe element carried by said head prongs,
  said hoe element comprising:
    a sheet having one of its ends doubled over to define a bent portion,
    said bent portion being slotted to receive the respective prongs of said head,
  and a pair of oppositely facing U-shaped locking elements received over and disposed longitudinally of said sheet bent portion with one of their legs respectively frictionally received between said sheet bent portion and said prongs and the other of their respective legs being positioned to overlie and frictionally engage said one side of said blade member.
2. The hand tool set forth in claim 1 wherein:
  said blade member is formed to define a plurality of prongs at one end thereof and a scraping edge at the other end thereof,
  and including means for removably mounting said blade member on said handle to alternately position its said ends through said locking elements,
  with the ends of said blade member prongs being turned laterally of said blade member to form a rake structure.
3. The hand tool set forth in claim 1 wherein:
  said sleeve member has an end thereof disposed adjacent said blade member and said sleeve member end defines an upstanding ridge, and including:
  a generally U-shaped clamping member having a shape complementing that of said ridge and engaging same,
  said clamping member overlying said handle and sleeve member end,
  and means for releasably securing said clamping member to said blade member to couple said blade member to said sleeve member, whereby said sleeve member may be moved longitudinally of said handle to extend and retract said blade member with respect to said pronged head,
  said ridge, said clamping member and said clamping member securing means comprising said means for securing said sleeve member to said blade member.

References Cited by the Examiner

UNITED STATES PATENTS

| | | | |
|---|---|---|---|
| 415,599 | 11/1889 | Woodworth | 56—400.05 |
| 1,302,348 | 4/1919 | Fleming | 172—374 |
| 2,268,066 | 12/1941 | Brooke | 56—400.05 |
| 2,435,473 | 2/1948 | Sonnenberg | 294—50.8 |
| 2,598,288 | 5/1952 | Navarre | 294—50.8 |
| 2,744,322 | 5/1956 | Gustafson | 30—249 |
| 2,753,630 | 7/1956 | Shoemaker | 30—249 |
| 2,767,545 | 10/1956 | Jenkins | 56—400.06 |
| 2,979,757 | 4/1961 | Smith | 47—1.5X |

FOREIGN PATENTS

| | | |
|---|---|---|
| 497,271 | 12/1938 | Great Britain. |
| 252,671 | 10/1948 | Switzerland. |

ANTONIO F. GUIDA, *Acting Primary Examiner.*

WILLIAM FELDMAN, RUSSELL R. KINSEY,
*Examiners.*

UNITED STATES PATENT OFFICE
CERTIFICATE OF CORRECTION

Patent No. 3,221,485                        December 7, 1965

Homer T. Jenkins

It is hereby certified that error appears in the above numbered patent requiring correction and that the said Letters Patent should read as corrected below.

Column 7, line 17, after "comprising:" insert -- an elongate handle, --.

Signed and sealed this 6th day of December 1966.

(SEAL)
Attest:

ERNEST W. SWIDER                              EDWARD J. BRENNER
Attesting Officer                                   Commissioner of Patents